United States Patent [19]
Krening et al.

[11] Patent Number: 6,122,747
[45] Date of Patent: Sep. 19, 2000

[54] INTELLIGENT SUBSYSTEM INTERFACE FOR MODULAR HARDWARE SYSTEM

[75] Inventors: Douglas N. Krening; Gregory B. Lannan, both of Larkspur; Michael J. Schneiderwind; Robert A. Schneiderwind, both of Castle Rock, all of Colo.; Robert T. Caffrey, Silver Spring, Md.

[73] Assignee: First Pass Inc., Castle Rock, Colo.

[21] Appl. No.: 08/924,194

[22] Filed: Sep. 5, 1997

[51] Int. Cl.[7] .................................................. G06F 1/26
[52] U.S. Cl. .............................. 713/323; 712/20; 712/32; 712/10; 712/11; 712/13; 712/15; 326/39; 326/41; 710/101
[58] Field of Search ............................... 713/300; 379/93; 710/101; 712/32, 20, 14, 10, 11, 13, 15; 326/41, 39

[56] References Cited

U.S. PATENT DOCUMENTS

| | | | |
|---|---|---|---|
| 4,467,445 | 8/1984 | Mueller et al. | 370/15 |
| 4,800,487 | 1/1989 | Mensch | 364/200 |
| 5,123,107 | 6/1992 | Mensch | 395/800 |
| 5,304,860 | 4/1994 | Ashby et al. | 307/296.3 |
| 5,347,181 | 9/1994 | Ashby et al. | 307/465 |
| 5,361,392 | 11/1994 | Fourcroy et al. | 395/800 |
| 5,369,777 | 11/1994 | Gephardt et al. | 395/800 |
| 5,469,553 | 11/1995 | Patrick | 713/323 |
| 5,586,265 | 12/1996 | Beukema | 1/20 |
| 5,923,830 | 7/1999 | Fuchs et al. | 714/11 |

*Primary Examiner*—Ayaz R. Sheikh
*Assistant Examiner*—Rupal D. Dharia
*Attorney, Agent, or Firm*—Thomas W. Hanson

[57] ABSTRACT

A single chip application specific integrated circuit (ASIC) which provides a flexible, modular interface between a subsystem and a standard system bus. The ASIC includes a microcontroller/microprocessor, a serial interface for connection to the bus, and a variety of communications interface devices available for coupling to the subsystem. A three-bus architecture, utilizing arbitration, provides connectivity within the ASIC and between the ASIC and the subsystem. The communication interface devices include UART (serial), parallel, analog, and external device interface utilizing bus connections paired with device select signals. A low power (sleep) mode is provided as is a processor disable option.

17 Claims, 15 Drawing Sheets

Legend for TYPE and ACTIVE fields:

CO  = CMOS output                    CTB = CMOS three-state bidirect
CI  = CMOS input                     CTO = CMOS three-state output
CUI = CMOS input (pull-up)           OSC = Oscillator input
CDI = CMOS input (pull-down)         AH  = Active High
CB  = CMOS bidirect                  AL  = Active Low

| Pin Name | Number | Type | Active | Char. | Description |
|---|---|---|---|---|---|
| VDDQ | 1 | PWR | | | +5V |
| UART_INT | 3 | CO | AH | OCN10 | UART 1&2 Interrupt |
| OD[15] | 4 | CTB | -- | BCND50 | Operand Data Bus (MSB) |
| OD[14] | 5 | CTB | -- | BCND50 | Operand Data Bus |
| OD[13] | 6 | CTB | -- | BCND50 | Operand Data Bus |
| VDD | 7 | PWR | | | +5V |
| VSS | 8 | PWR | | | GND |
| OD[12] | 9 | CTB | -- | BCND50 | Operand Data Bus |
| OD[11] | 10 | CTB | -- | BCND50 | Operand Data Bus |
| OD[10] | 11 | CTB | -- | BCND50 | Operand Data Bus |
| OD[9] | 12 | CTB | -- | BCND50 | Operand Data Bus |
| OD[8] | 13 | CTB | -- | BCND50 | Operand Data Bus |
| OD[7] | 14 | CTB | -- | BCND50 | Operand Data Bus |
| OD[6] | 15 | CTB | -- | BCND50 | Operand Data Bus |
| OD[5] | 16 | CTB | -- | BCND50 | Operand Data Bus |
| OD[4] | 17 | CTB | -- | BCND50 | Operand Data Bus |
| OD[3] | 18 | CTB | -- | BCND50 | Operand Data Bus |
| OD[2] | 19 | CTB | -- | BCND50 | Operand Data Bus |
| OD[1] | 20 | CTB | -- | BCND50 | Operand Data Bus |
| OD[0] | 21 | CTB | -- | BCND50 | Operand Data Bus (LSB) |
| OA[15] | 22 | CTB | -- | BCND50 | Operand Address Bus (MSB) |
| OA[14] | 23 | CTB | -- | BCND50 | Operand Address Bus |
| OA[13] | 24 | CTB | -- | BCND50 | Operand Address Bus |
| OA[12] | 25 | CTB | -- | BCND50 | Operand Address Bus |
| OA[11] | 26 | CTB | -- | BCND50 | Operand Address Bus |
| OA[10] | 27 | CTB | -- | BCND50 | Operand Address Bus |
| VDDQ | 28 | PWR | | | +5V |
| VSSQ | 29 | PWR | | | GND |
| OA[9] | 30 | CTB | -- | BCND50 | Operand Address Bus |
| OA[8] | 31 | CTB | -- | BCND50 | Operand Address Bus |
| OA[7] | 32 | CTB | -- | BCND50 | Operand Address Bus |
| OA[6] | 33 | CTB | -- | BCND50 | Operand Address Bus |
| OA[5] | 34 | CTB | -- | BCND50 | Operand Address Bus |

FIG. 8A

| Pin Name | Number | Type | Active | Char. | Description |
|---|---|---|---|---|---|
| OA[4] | 35 | CTB | -- | BCND50 | Operand Address Bus |
| OA[3] | 36 | CTB | -- | BCND50 | Operand Address Bus |
| OA[2] | 37 | CTB | -- | BCND50 | Operand Address Bus |
| OA[1] | 38 | CTB | -- | BCND50 | Operand Address Bus |
| OA[0] | 39 | CTB | -- | BCND50 | Operand Address Bus (LSB) |
| OE_N | 40 | CTB | AL | BCND50 | Ins Output Enable |
| WE_N | 41 | CTB | AL | BCND50 | Ins Write Enable |
| DI[2] | 42 | CDI | -- | ICN30 | Discrete Input #2 |
| DI[1] | 43 | CDI | -- | ICN30 | Discrete Input #1 |
| DO[7] | 44 | CO | -- | OCN10 | Discrete Output |
| DO[6] | 45 | CO | -- | OCN10 | Discrete Output |
| DO[5] | 46 | CO | -- | OCN10 | Discrete Output |
| DO[4] | 47 | CO | -- | OCN10 | Discrete Output |
| VDD | 48 | PWR | | | +5V |
| VSS | 49 | PWR | | | GND |
| DO[3] | 50 | CO | -- | OCN10 | Discrete Output |
| DO[2] | 51 | CO | -- | OCN10 | Discrete Output |
| DO[1] | 52 | CO | -- | OCN10 | Discrete Output |
| DO[0] | 53 | CO | -- | OCN10 | Discrete Output |
| INT[6]_N | 54 | CUI | AL | ICN20 | User Interrupt |
| INT[5]_N | 55 | CUI | AL | ICN20 | User Interrupt |
| INT[4]_N | 56 | CUI | AL | ICN20 | User Interrupt |
| INT[3]_N | 57 | CUI | AL | ICN20 | User Interrupt |
| INT[2]_N | 58 | CUI | AL | ICN20 | User Interrupt |
| INT[1]_N | 59 | CUI | AL | ICN20 | User Interrupt |
| INT[0]_N | 60 | CUI | AL | ICN20 | User Interrupt |
| BRQ_N | 61 | CO | AL | OCN10 | Bus Request |
| BGNT_N | 62 | CUI | AL | ICN20 | Bus Grant |
| BUSY_N | 63 | CUI | AL | ICN20 | Bus Busy |
| BGACK_N | 64 | CTO | AL | ZCN10 | Bus Grant Acknowledge |
| STATE1_N | 65 | CTB | AL | OCN10 | System Output |
| M_IO_N | 66 | CTB | AL | BCND50 | Memory or I/O |
| R_WR_N | 67 | CTB | AL | BCND50 | Read / Write |
| DS_N | 68 | CTB | AL | BCND50 | Data Strobe |
| VDDQ | 69 | PWR | | | +5V |
| VSSQ | 70 | PWR | | | GND |
| DTACK_N | 71 | CUI | AL | ICN20 | Data Transfer Ack |
| MCHNE[2] | 72 | CDI | AH | ICN30 | System Fault #2 |
| MCHNE[1] | 73 | CDI | AH | ICN30 | System Fault #1 |

FIG. 8B

| Pin Name | Number | Type | Active | Char. | Description |
|---|---|---|---|---|---|
| MRST_N | 74 | CUI | AL | ICN20 | Master Reset |
| VDDQ | 76 | PWR | | | +5V |
| VSSQ | 77 | PWR | | | GND |
| TIMCLK | 79 | CI | -- | ICNCLK | Timer/UART Clock |
| BTERR_N | 80 | CUI | AL | ICN20 | Bus Time Error |
| MPROT | 81 | CDI | AH | ICN30 | Memory Protect Error |
| PFAIL_N | 82 | CUI | AL | ICN20 | Power Fail Interrupt |
| VDD | 83 | PWR | | | +5V |
| VSS | 84 | PWR | | | GND |
| UARTIN | 85 | CUI | AH | ICN20 | UART Input |
| UARTOUT | 86 | CO | AH | OCN10 | UART Output |
| RD[15] | 87 | CTB | -- | BCND50 | Instruction Data Bus (MSB) |
| RD[14] | 88 | CTB | -- | BCND50 | Instruction Data Bus |
| RD[13] | 89 | CTB | -- | BCND50 | Instruction Data Bus |
| RD[12] | 90 | CTB | -- | BCND50 | Instruction Data Bus |
| RD[11] | 91 | CTB | -- | BCND50 | Instruction Data Bus |
| RD[10] | 92 | CTB | -- | BCND50 | Instruction Data Bus |
| RD[9] | 93 | CTB | -- | BCND50 | Instruction Data Bus |
| RD[8] | 94 | CTB | -- | BCND50 | Instruction Data Bus |
| RD[7] | 95 | CTB | -- | BCND50 | Instruction Data Bus |
| RD[6] | 96 | CTB | -- | BCND50 | Instruction Data Bus |
| RD[5] | 97 | CTB | -- | BCND50 | Instruction Data Bus |
| RD[4] | 98 | CTB | -- | BCND50 | Instruction Data Bus |
| RD[3] | 99 | CTB | -- | BCND50 | Instruction Data Bus |
| RD[2] | 100 | CTB | -- | BCND50 | Instruction Data Bus |
| RD[1] | 101 | CTB | -- | BCND50 | Instruction Data Bus |
| RD[0] | 102 | CTB | -- | BCND50 | Instruction Data Bus (LSB) |
| RA[19] | 103 | CTB | -- | BCND50 | Instruction Address Bus (MSB) |
| VDDQ | 104 | PWR | | | +5V |
| VSSQ | 105 | PWR | | | GND |
| RA[18] | 106 | CTB | -- | BCND50 | Instruction Address Bus |
| RA[17] | 107 | CTB | -- | BCND50 | Instruction Address Bus |
| RA[16] | 108 | CTB | -- | BCND50 | Instruction Address Bus |
| RA[15] | 109 | CTB | -- | BCND50 | Instruction Address Bus |
| RA[14] | 110 | CTB | -- | BCND50 | Instruction Address Bus |
| RA[13] | 111 | CTB | -- | BCND50 | Instruction Address Bus |
| RA[12] | 112 | CTB | -- | BCND50 | Instruction Address Bus |
| RA[11] | 113 | CTB | -- | BCND50 | Instruction Address Bus |
| RA[10] | 114 | CTB | -- | BCND50 | Instruction Address Bus |

FIG. 8C

| Pin Name | Number | Type | Active | Char. | Description |
|---|---|---|---|---|---|
| RA[9] | 115 | CTB | -- | BCND50 | Instruction Address Bus |
| RA[8] | 116 | CTB | -- | BCND50 | Instruction Address Bus |
| RA[7] | 117 | CTB | -- | BCND50 | Instruction Address Bus |
| RA[6] | 118 | CTB | -- | BCND50 | Instruction Address Bus |
| RA[5] | 119 | CTB | -- | BCND50 | Instruction Address Bus |
| RA[4] | 120 | CTB | -- | BCND50 | Instruction Address Bus |
| RA[3] | 121 | CTB | -- | BCND50 | Instruction Address Bus |
| RA[2] | 122 | CTB | -- | BCND50 | Instruction Address Bus |
| RA[1] | 123 | CTB | -- | BCND50 | Instruction Address Bus |
| VDD | 124 | PWR | | | +5V |
| VSS | 125 | PWR | | | GND |
| RA[0] | 126 | CTB | -- | BCND50 | Instruction Address Bus (LSB) |
| TXINHBA | 127 | CO | AH | OCN10 | 1553 Transmit Inhibit A |
| TXA_1773 | 128 | CO | -- | OCN10 | 1773 Transmit Chan A |
| TXINHBB | 129 | CO | AH | OCN10 | 1553 Transmit Inhibit B |
| TXB_1773 | 130 | CO | -- | OCN10 | 1773 Transmit Chan B |
| BCRTSEL | 131 | CUI | -- | ICN20 | BC/RT Select |
| LOCK | 132 | CUI | AH | ICN20 | Lock |
| SHCS_N | 133 | CO | AL | OCN10 | Shared Memory CS |
| RAO | 134 | CI | -- | ICN10 | Receive Chan A One |
| RAZ | 135 | CI | -- | ICN10 | Receive Chan A Zero |
| RBO | 136 | CI | -- | ICN10 | Receive Chan B One |
| RBZ | 137 | CI | -- | ICN10 | Receive Chan B Zero |
| RTA[4] | 138 | CUI | -- | ICN20 | Remote Terminal Address (MSB |
| RTA[3] | 139 | CUI | -- | ICN20 | Remote Terminal Address |
| RTA[2] | 140 | CUI | -- | ICN20 | Remote Terminal Address |
| RTA[1] | 141 | CUI | -- | ICN20 | Remote Terminal Address |
| RTA[0] | 142 | CUI | -- | ICN20 | Remote Terminal Address (LSB |
| RTPTY | 143 | CUI | -- | ICN20 | RT Address Parity |
| SSYSF | 144 | CI | AH | ICN10 | Subsystem Fail |
| VDDQ | 145 | PWR | | | +5V |
| VSSQ | 146 | PWR | | | GND |
| TAO | 147 | CO | -- | OCN10 | Transmit Chan A One |
| TAZ | 148 | CO | -- | OCN10 | Transmit Chan A Zero |
| TBO | 149 | CO | -- | OCN10 | Transmit Chan B One |
| TBZ | 150 | CO | -- | OCN10 | Transmit Chan B Zero |
| VDDQ | 151 | PWR | | | +5V |

FIG. 8D

| Pin Name | Number | Type | Active | Char. | Description |
|---|---|---|---|---|---|
| VSSQ | 152 | PWR | | | GND |
| VDDQ | 153 | PWR | | | +5V |
| BCRTF | 154 | CO | AH | OCN10 | BCRTM Fail |
| COMSTR | 155 | CO | AL | OCN10 | (RT) Command Strobe |
| HPINT_N | 156 | CO | AL | OCN10 | High Priority Int |
| SRD_N | 157 | CO | AL | OCN10 | Shared Memory Read |
| SWR_N | 158 | CO | AL | OCN10 | Shared Memory Write |
| VDD | 159 | PWR | | | +5V |
| VSS | 160 | PWR | | | GND |
| SDTINTL_N | 161 | CO | AL | OCN10 | Standard Int Level |
| STDINTP_N | 162 | CO | AL | OCN10 | Standard Int Pulse |
| SHD[15] | 163 | CTB | -- | BCND50 | Shared Data Bus (MSB) |
| SHD[14] | 164 | CTB | -- | BCND50 | Shared Data Bus |
| SHD[13] | 165 | CTB | -- | BCND50 | Shared Data Bus |
| SHD[12] | 166 | CTB | -- | BCND50 | Shared Data Bus |
| SHD[11] | 167 | CTB | -- | BCND50 | Shared Data Bus |
| SHD[10] | 168 | CTB | -- | BCND50 | Shared Data Bus |
| SHD[9] | 169 | CTB | -- | BCND50 | Shared Data Bus |
| SHD[8] | 170 | CTB | -- | BCND50 | Shared Data Bus |
| SHD[7] | 171 | CTB | -- | BCND50 | Shared Data Bus |
| SHD[6] | 172 | CTB | -- | BCND50 | Shared Data Bus |
| SHD[5] | 173 | CTB | -- | BCND50 | Shared Data Bus |
| SHD[4] | 174 | CTB | -- | BCND50 | Shared Data Bus |
| SHD[3] | 175 | CTB | -- | BCND50 | Shared Data Bus |
| SHD[2] | 176 | CTB | -- | BCND50 | Shared Data Bus |
| SHD[1] | 177 | CTB | -- | BCND50 | Shared Data Bus |
| SHD[0] | 178 | CTB | -- | BCND50 | Shared Data Bus (LSB) |
| CLK_12MHZ | 179 | OSC | -- | ICNCLK | BCRTM Clock |
| VDDQ | 180 | PWR | | | +5V |
| VSSQ | 181 | PWR | | | GND |
| WAKE_UP_N | 182 | CUI | AL | ICN20 | Ext Sleep Wake-up |
| TEST[2] | 183 | CDI | AH | ICN30 | Test Mode, bit-1 |
| TEST[1] | 184 | CDI | AH | ICN30 | Test Mode, bit-0 |
| TRST_N (1) | 185 | TUI | AL | -- | JTAG Reset |
| TDO (2) | 186 | TO | -- | 2mA | JTAG Scan Out |
| TDI (3) | 187 | TUI | -- | -- | JTAG Scan Instruction |
| TMS (4) | 188 | TI | -- | -- | JTAG State Machine |
| TCLK (5) | 189 | TI | -- | -- | JTAG Clock |
| SHA[15] | 190 | CO | -- | OCND10 | Shared Address Bus (MSB) |
| SHA[14] | 191 | CO | -- | OCND10 | Shared Address Bus |

FIG. 8E

| Pin Name | Number | Type | Active | Char. | Description |
|---|---|---|---|---|---|
| SHA[13] | 192 | CO | -- | OCND10 | Shared Address Bus |
| SHA[12] | 193 | CO | -- | OCND10 | Shared Address Bus |
| SHA[11] | 194 | CO | -- | OCND10 | Shared Address Bus |
| SHA[10] | 195 | CO | -- | OCND10 | Shared Address Bus |
| SHA[9] | 196 | CO | -- | OCND10 | Shared Address Bus |
| SHA[8] | 197 | CO | -- | OCND10 | Shared Address Bus |
| SHA[7] | 198 | CO | -- | OCND10 | Shared Address Bus |
| SHA[6] | 199 | CO | -- | OCND10 | Shared Address Bus |
| VDD | 200 | PWR | | | +5V |
| VSS | 201 | PWR | | | GND |
| SHA[5] | 202 | CO | -- | OCND10 | Shared Address Bus |
| SHA[4] | 203 | CO | -- | OCND10 | Shared Address Bus |
| SHA[3] | 204 | CO | -- | OCND10 | Shared Address Bus |
| SHA[2] | 205 | CO | -- | OCND10 | Shared Address Bus |
| SHA[1] | 206 | CO | -- | OCND10 | Shared Address Bus |
| SHA[0] | 207 | CO | -- | OCND10 | Shared Address Bus (LSB) |
| SST_EQU_N | 208 | CO | AL | OCN10 | SST#4 Equals Pulse |
| SST3_LATCH | 209 | CI | AH | ICN10 | SST#3 Hardware Latch |
| SST2_BUS_LAT | 210 | CO | AH | OCN10 | SST#2 Bus Controller Latch |
| BUS_SEL0_N | 211 | CO | AL | OCN10 | Bus Select Pulse |
| OSCOUT | 212 | CO | -- | OCN10 | Oscillator Output |
| OSCIN | 213 | CI | -- | ICN10 | Oscillator Input |
| WAIT_SEL_N | 214 | CUI | AL | ICN20 | Ext Wait-state Input |
| PROM_SEL_N | 215 | CO | AL | OCN10 | Inst. PROM Select |
| PRAM_SEL_N | 216 | CO | AL | OCN10 | Inst. RAM Select |
| DRAM_SEL_N | 217 | CO | AL | OCN10 | Data RAM Select |
| WDT_RST_N | 218 | CO | AL | OCN10 | WDT Reset |
| WDT_DIS_N | 219 | CUI | AL | ICN20 | WDT Disable Input |
| CLK_D16 | 220 | CO | -- | OCN10 | Sys Clk (OSCIN / 16) |
| VDDQ | 221 | PWR | | | +5V |
| VSSQ | 222 | PWR | | | GND |
| SST_CLK | 223 | CI | -- | ICN10 | SST Input Clock |
| SST_LATCH | 224 | CI | AH | ICN30 | SST#2 Hardware Latch |
| DWR_N | 225 | CO | AL | BCND50 | External Device Write |
| VSSQ | 227 | PWR | | | GND |
| VDDQ | 228 | PWR | | | +5V |
| VSSQ | 229 | PWR | | | GND |
| DRD_N | 230 | CO | AL | BCND50 | External Device Read |
| DEV[4]_SEL_N | 231 | CO | AL | OCN10 | External Device Select 4 |
| DEV[3]_SEL_N | 232 | CO | AL | OCN10 | External Device Select 3 |

FIG. 8F

| Pin Name | Number | Type | Active | Char. | Description |
|---|---|---|---|---|---|
| DEV[2]_SEL_N | 233 | CO | AL | OCN10 | External Device Select 2 |
| DEV[1]_SEL_N | 234 | CO | AL | OCN10 | External Device Select 1 |
| VDD | 235 | PWR | | | +5V |
| VSS | 236 | PWR | | | GND |
| CLK_IN_N | 237 | CI | AL | ICN10 | Master/Slave Indicator |
| SP_DATA_IN | 238 | CI | -- | ICN10 | Ser-to-par Data In |
| SP_ENA_N | 239 | CB | -- | BCND10 | Ser-to-par Enable |
| SP_CLK | 240 | CB | -- | BCND10 | Ser-to-par Bit Clock |
| SP_WRD_CLK | 241 | CO | AL | OCN10 | Ser-to-par Word Clock |
| PS_DATA_OUT | 242 | CO | -- | OCN10 | Par-to-ser Data Out |
| PS_ENA_N | 243 | CB | -- | BCND10 | Par-to-ser Enable |
| PS_CLK | 244 | CB | -- | BCND10 | Par-to-ser Bit Clock |
| PS_WRD_CLK | 245 | CO | AL | OCN10 | Ser-to-par Word Clock |
| ANA_SEL_N | 246 | CO | AL | OCN10 | A/D Converter Select Input |
| ACHN[3] | 247 | CTO | | | Analog Channel Bit 3 Output |
| ACHN[2] | 248 | CTO | | | Analog Channel Bit 2 Output |
| ACHN[1] | 249 | CTO | | | Analog Channel Bit 1 Output |
| ACHN[0] | 250 | CTO | -- | ZCN10 | Analog Channel Bit 0 Output |
| ICHN[2] | 251 | CTO | | | Current Channel Bit 2 Output |
| ICHN[1] | 252 | CTO | | | Current Channel Bit 1 Output |
| ICHN[0] | 253 | CTO | -- | ZCN10 | Current Channel Bit 0 Output |
| ANA_ENA_N | 254 | CO | -- | OCN10 | Analog Power Enable Output |
| T1_CLK2 | 255 | CI | -- | ICN10 | Clock-2 In |
| VDDQ | 256 | PWR | | | +5V |
| VSSQ | 257 | PWR | | | GND |
| T1_CLK1 | 258 | CI | -- | ICN10 | Clock-1 In |
| T1_CLK0 | 259 | CI | -- | ICN10 | Clock-0 In |
| T1_GATE2 | 260 | CDI | AH | ICN30 | Clock-2 Gate Enable |
| T1_GATE1 | 261 | CDI | AH | ICN30 | Clock-1 Gate Enable |
| T1_GATE0 | 262 | CDI | AH | ICN30 | Clock-0 Gate Enable |
| T1_OUT2 | 263 | CO | -- | OCN10 | Clock-2 Out |
| T1_OUT1 | 264 | CO | -- | OCN10 | Clock-1 Out |
| T1_OUT0 | 265 | CO | -- | OCN10 | Clock-0 Out |
| P1A[7] | 266 | CTB | -- | BCND50 | I/O Port A |
| P1A[6] | 267 | CTB | -- | BCND50 | I/O Port A |
| P1A[5] | 268 | CTB | -- | BCND50 | I/O Port A |
| P1A[4] | 269 | CTB | -- | BCND50 | I/O Port A |
| P1A[3] | 270 | CTB | -- | BCND50 | I/O Port A |
| P1A[2] | 271 | CTB | -- | BCND50 | I/O Port A |
| P1A[1] | 272 | CTB | -- | BCND50 | I/O Port A |

FIG. 8G

| Pin Name | Number | Type | Active | Char. | Description |
|---|---|---|---|---|---|
| P1A[0] | 273 | CTB | -- | BCND50 | I/O Port A |
| P1B[7] | 274 | CTB | -- | BCND50 | I/O Port B |
| P1B[6] | 275 | CTB | -- | BCND50 | I/O Port B |
| VDD | 276 | PWR | | | +5V |
| VSS | 277 | PWR | | | GND |
| P1B[5] | 278 | CTB | -- | BCND50 | I/O Port B |
| P1B[4] | 279 | CTB | -- | BCND50 | I/O Port B |
| P1B[3] | 280 | CTB | -- | BCND50 | I/O Port B |
| P1B[2] | 281 | CTB | -- | BCND50 | I/O Port B |
| P1B[1] | 282 | CTB | -- | BCND50 | I/O Port B |
| P1B[0] | 283 | CTB | -- | BCND50 | I/O Port B |
| P1C[7] | 284 | CTB | -- | BCND50 | I/O Port C |
| P1C[6] | 285 | CTB | -- | BCND50 | I/O Port C |
| P1C[5] | 286 | CTB | -- | CND50 | I/O Port C |
| P1C[4] | 287 | CTB | -- | BCND50 | I/O Port C |
| P1C[3] | 288 | CTB | -- | BCND50 | I/O Port C |
| P1C[2] | 289 | CTB | -- | BCND50 | I/O Port C |
| P1C[1] | 290 | CTB | -- | BCND50 | I/O Port C |
| P1C[0] | 291 | CTB | -- | BCND50 | I/O Port C |
| TXD1 | 292 | CO | -- | OCN10 | Transmit Data-1 |
| RXD1 | 293 | CI | -- | ICN10 | Receive Data-1 |
| CTS1_N | 294 | CI | -- | ICN10 | Clear-to-send 1 |
| RTS1_N | 295 | CO | -- | OCN10 | Request-to-send 1 |
| TXD2 | 296 | CO | -- | OCN10 | Transmit Data-2 |
| VDDQ | 297 | PWR | | | +5V |
| VSSQ | 298 | PWR | | | GND |
| RXD2 | 299 | CI | -- | ICN10 | Receive Data-2 |
| CTS2_N | 300 | CI | -- | ICN10 | Clear-to-send 2 |
| RTS2_N | 301 | CO | -- | OCN10 | Request-to-send 2 |
| VSSQ | 304 | PWR | | | GND |

FIG. 8H

INTELLIGENT SUBSYSTEM INTERFACE FOR MODULAR HARDWARE SYSTEM

GOVERNMENT RIGHTS

This invention was made with Government support under contract number NAS5-32600 SUB: 9335-031 awarded by NASA. The Government has certain rights in the invention.

FIELD OF THE INVENTION

This invention relates, in general, to integrated circuits. More particularly, the invention relates to an application specific integrated circuit (ASIC) configured to provide a range of functions in a convenient building block package.

BACKGROUND OF THE INVENTION

When a spacecraft, such as a communications satellite, is built it has both processing and non-processing aspects. The non-processing aspects include the structural, power, and thermal subsystems. The processing aspect includes all of the subsystems that process or generate data or control parts of the spacecraft. Typically, each subsystem will address a specific functional area, such as guidance, communications, and data handling. This decomposition allows each subsystem to be developed with relative independence and to operate independently. A common hardware architecture for such a system will use a system data communication bus, which interconnects all of the subsystems.

More so than other hardware system, spacecraft design is driven by several factors other than the operational functionality of the system. These factors include size, weight, power use, and heat generation in addition to the ability to resist environmental conditions such as radiation, vibration, and temperature. Size, weight, power and heat considerations typically drive the design to minimize the number of components in any system or subsystem.

In a traditional development, each of the subsystems will design and implement its own interface, or connection, to the system bus. This interface will be unique to each subsystem, implementing the exact set of capabilities needed by that subsystem. The interface will differ from subsystem to subsystem within the same system. It will also vary between different implementations of the same subsystem across different systems. This variation in design is driven both by the needs of the subsystem and the need to minimize the size, weight, etc. by minimizing the number of components.

Common, reusable designs have not been developed since each subsystem will need a different set of capabilities, such as serial communication, parallel communication, etc. A universal solution which meets all possible needs would include extraneous components, unused by the subsystem, which contribute to the parts count and negatively impact the design factors.

Often, the system bus interface will be implemented as a printed circuit board (PCB) using standard components that are qualified for the environmental conditions. This would require approximately 20 LSI and MSI integrated circuits, plus discrete components, and would occupy up to 160 square inches of printed circuit board area.

While the technology is available to implement the interface as a single integrated circuit, such as an application specific integrated circuit (ASIC), this is not usually economically viable. The very small number of each version is insufficient to offset the fixed startup costs required to begin production.

The PCB approach incurs several costs relative to the ASIC solution. It is larger; weighs more; has a higher parts count; and consumes more power. Further, because each is a new design and implementation, time and costs to design, fabricate, and test must be paid for each new interface.

Attempts have been made to develop ASICs that are applicable to range of common subsystems. Chip sets are available which implement the common data protocols, such as MIL-STD-1553. However, such ASICs usually do not include a processor for a variety of reasons. These include: inability to achieve the required component density in a radiation hardened configuration; software debug techniques, such as in-circuit emulation, could not be used with ASIC embedded processors; and the cost of developing a new processor design for use in an ASIC was prohibitive.

There is a need for an ASIC implementation of an interface to a system bus that is sufficiently flexible that it can be used in a variety of subsystem applications. With enough re-use, sufficient quantity can be produced to bring the price per part down to a viable level. Ideally, such an ASIC would replace the PCB currently used with a single chip, resulting in significant size, weight, power use, and heat generation savings. Additional benefits could be realized reducing design time and increasing reliability. These would result from not having to re-design and re-test the interface for each implementation.

SUMMARY OF THE INVENTION

The present invention discloses a single-chip ASIC which serves as a standard interface between a subsystem and a system bus. The ASIC includes a microprocessor; a serial interface circuit; a circuit for providing a clock signal to the microprocessor; a low power (sleep mode) logic circuit which functions by blocking the transmission of the clock signal from the clock circuit to the microprocessor; a sleep mode activation circuit which allows the microprocessor to activate the low power mode; and a sleep mode termination circuit which allows the serial interface to terminate the low power mode.

In a further embodiment of the invention, it includes an operand bus connected to the microprocessor and a variety of plural communication devices, connected to the operand bus, and having interface terminals external to the ASIC. These communication devices may support any of a variety of communication protocols including serial, parallel, and analog.

In a still further embodiment of the invention, shared memory is used which is accessible to both the microprocessor and the serial system bus interface. Arbitration is used to limit access to the shared memory to one at a time.

In a still further embodiment of the invention, the ability to disable the internal microprocessor is provided along with the ability to connect the ASIC to an external processor which can access the remaining devices on the ASIC. The external device may be another copy of the ASIC or an independent device.

The disclosed invention provides a single integrated circuit (IC) chip which provides the same functionality usually implemented on a printed circuit board. The IC implementation saves weight, size, power and generates less heat. By providing a variety of interface options to the subsystem, more than any one subsystem might need, the invention is usable with a wider range of subsystems. This allows the production volume to be increased, making production economically viable.

BRIEF DESCRIPTION OF THE DRAWINGS

FIG. 8 is a table of external pin interfaces including the pin number, name, and signal description for the invention configured as a 304 pin flatpack.

DETAILED DESCRIPTION OF THE INVENTION

While the primary market for the disclosed invention is the spacecraft industry, it is equally applicable to any hardware system in which a modular subsystem approach is desirable. The following description will focus on the invention's use within a spacecraft system. Analogous uses in non-spacecraft systems will be obvious to those skilled in the art.

The following is a brief glossary of terms used herein. The supplied definitions are applicable throughout this specification and the claims unless the term is clearly used in another manner.

C&DH—Command and Data Handling subsystem.

GNC—Guidance, Navigation and Control subsystem.

ESN—Essential Services Node. An acronym for the present invention as it is used within a spacecraft system.

UART—Universal Asynchronous Receiver/Transmitter

UTMC—United Technologies Microelectronics Center, Inc.

RISC—reduced instruction set computer

Memory Mapped I/O—a well known technique in the art of utilizing logical memory addresses to access I/O devices connected to the bus. A read or write (as appropriate) to that logical address will result in data being transferred from or to the device.

MIL-STD—Military Standard. Equipment specifications, such as those propagated by the Department of Defense.

MIL-STD-1553, MIL-STD-1773—specifications for a serial communications interface. Both use the same protocol, but they differ in their medium. 1553 uses twisted, shielded copper pair or co-axial cable while 1773 uses fiber optic. A communications interface that supports the protocol can work with either type of bus by substituting the appropriate transceiver. Herein, where 1553 is used it is generally understood to include either 1553, 1773, or both.

Bus Controller, Remote Terminal—terms specific to the MIL-STD-1553/1773 serial bus. The Bus Controller controls, or directs, all communications on the bus. A Remote Terminal sends and receives data only when commanded by the Bus Controller.

The various drawing figures disclose the present invention in detail showing the preferred embodiment. The following discussion is with reference to these figures.

Figure 1:
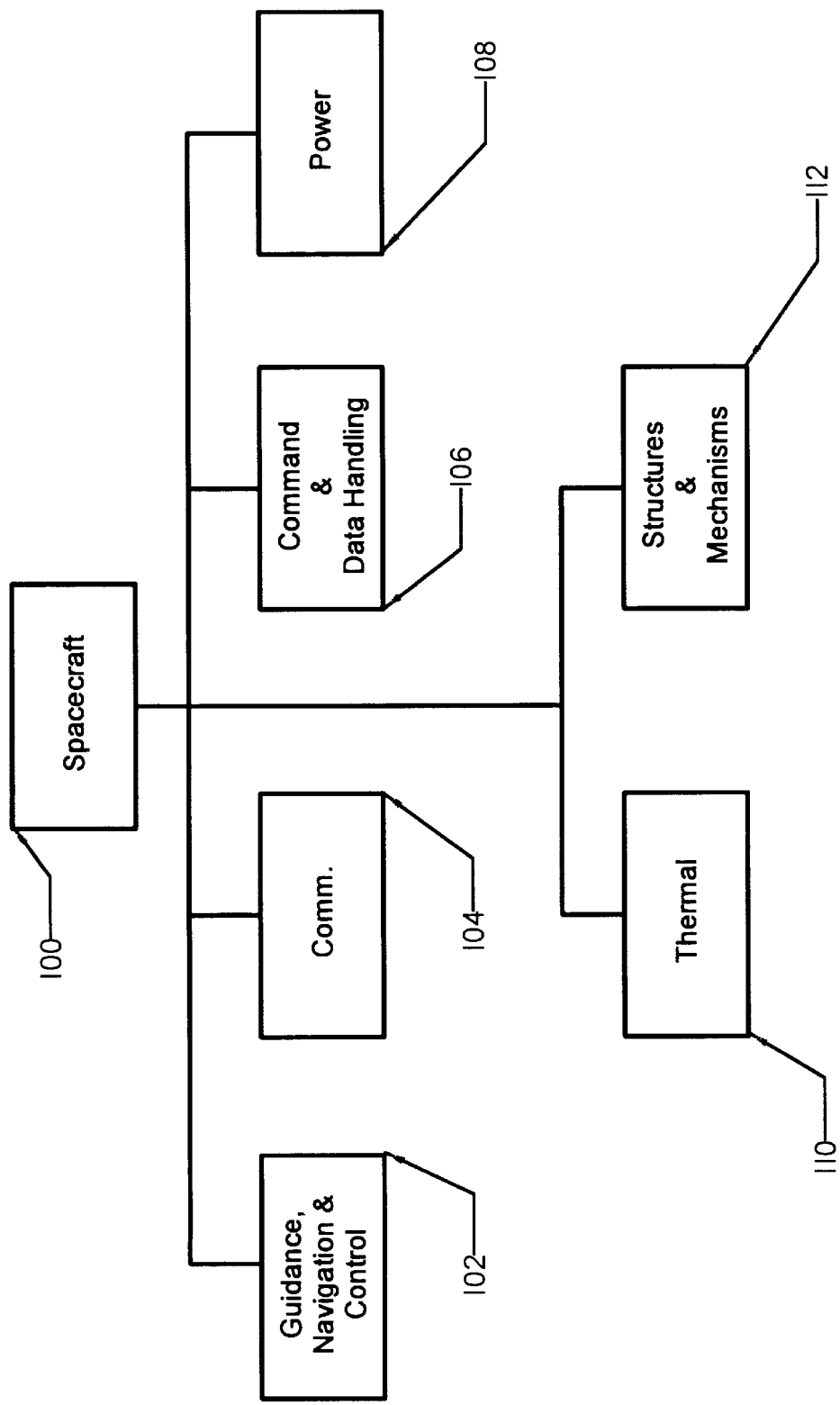
FIG. 1 is a block diagram of a typical spacecraft system showing the major subsystems.

FIG. 1 presents a block diagram of a typical spacecraft system, 100. Note that any or all of the subsystems may be redundant, having two or more versions as necessary to meet the reliability needs of the system. The Guidance, Navigation, and Control (GNC) subsystem, 102, provides attitude control and movement functionality. The Communications subsystem, 104, handles the up-load and download of data between the spacecraft and its ground systems. The Command and Data Handling (C&DH) subsystem, 106, handles the processing of commands, and transfer and storage of data within the spacecraft. The Power subsystem, 108, provides power to the other subsystems and is commanded by the C&DH subsystem. The Thermal subsystem, 110, provides heating, cooling, and thermal shielding as necessary. Some components, such as heaters, may be controlled by the C&DH subsystem. The Structures and Mechanisms subsystem, 112, contains the physical structure and mechanical components.

Figure 2:
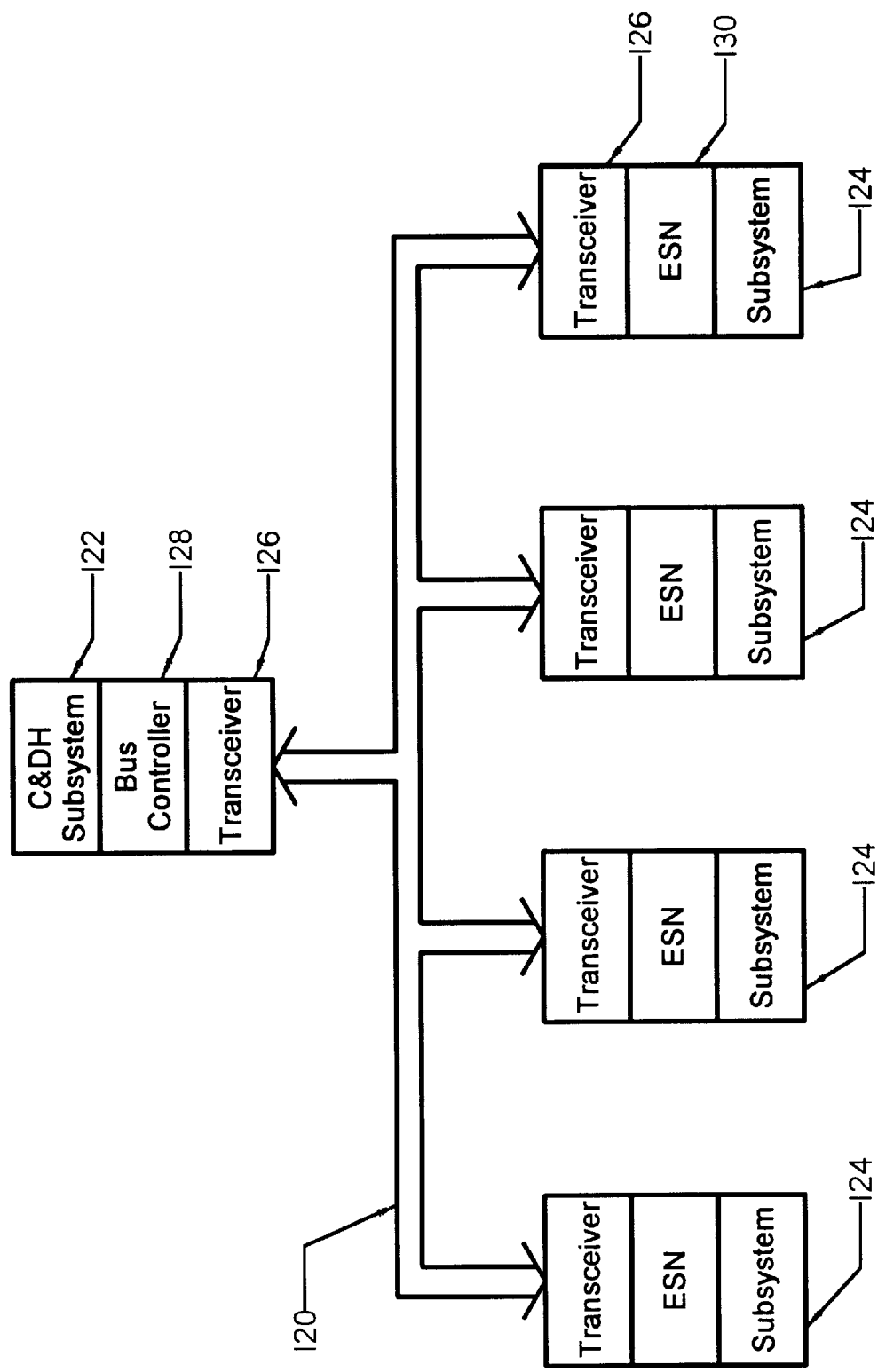
FIG. 2 is a block diagram of the spacecraft system showing multiple instances of the invention used as a standardized interface between multiple subsystems and the system bus.

FIG. 2 provides a slightly more detailed view of the spacecraft system. A common system architecture will use a system bus, 120, to provide communications between the subsystems. Often, the C&DH subsystem, 122, is established as the bus controller or bus master. It maintains control over all communications that take place on the system bus. Each of the other subsystems, 124, are passive participants on the systems bus, transferring data only when told to do so by the bus controller. In MIL-STD-1553 terminology, they are "remote terminals." Each of the subsystems, C&DH included, uses a transceiver, 126, to provide an electrical (or optical) coupling to the system bus. Connected to the transceiver will be the component that provides the logical, or protocol, interface to the bus. In the C&DH subsystem, this is the bus controller, 128. For the other subsystems, this functionality is provided by the present invention, known as the Essential Services Node (ESN), 130. Every subsystem using an ESN thereby has a common, standard interface to the system bus. Optionally, the ESN can also be used to provide the bus controller functionality in the C&DH subsystem.

In addition, the ESN may be used to interface specific instrumentation or control packages to the system bus. A data collection instrument may be used to gather data about the spacecraft or one of the specific subsystems. A device controller may be used to actively control a mechanical or electrical component, such as an antenna.

Figure 3:
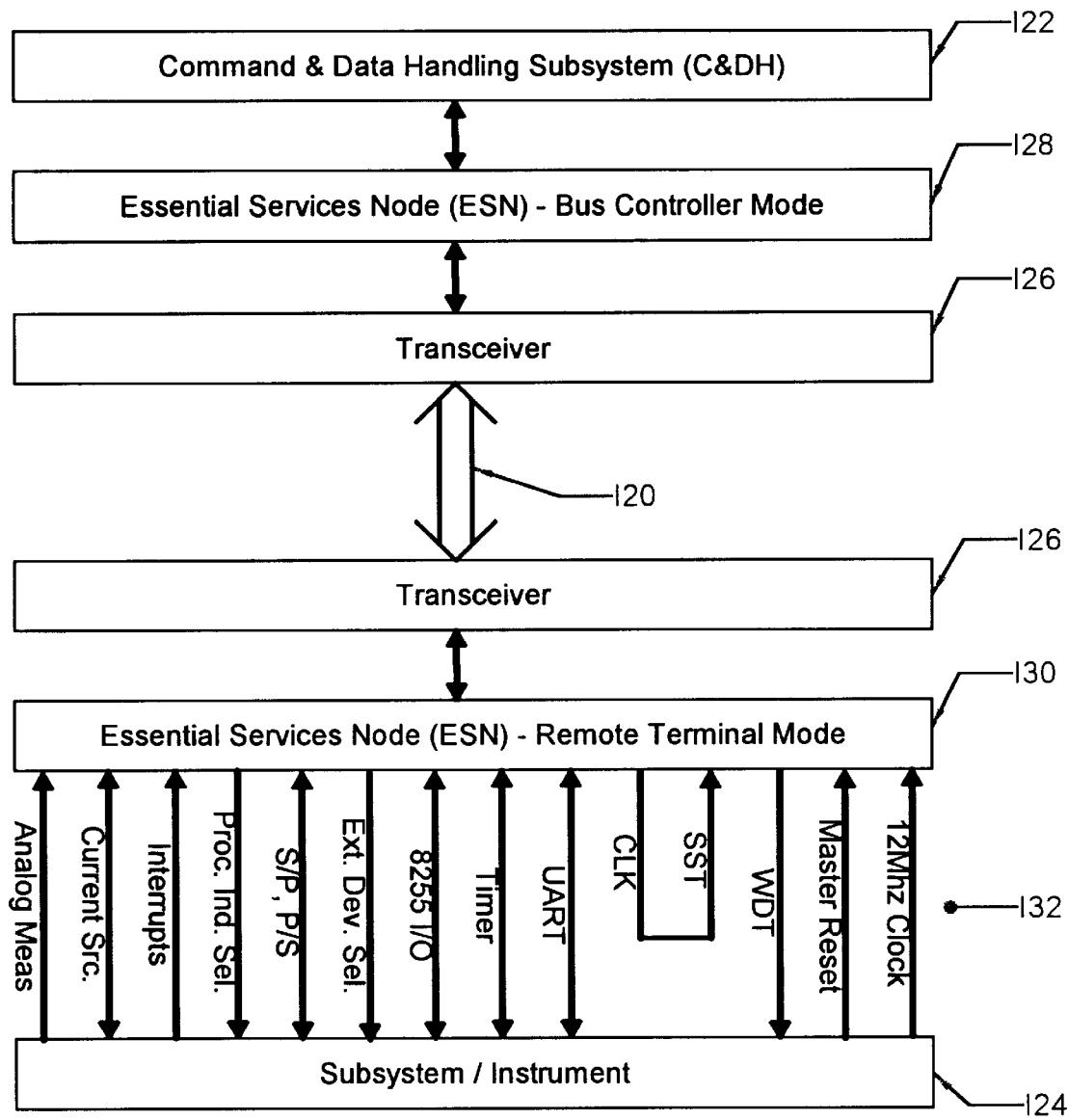
FIG. 3 is a block diagram illustrating the use of a single instance of the invention as the interface to one subsystem of a system.

FIG. 3 provides a more detailed view of the present invention, the ESN, as it would be used within a typical subsystem. In this embodiment, an ESN, configured as a bus controller, 128, is used in the C&DH subsystem, 122 and an ESN, configured as a remote terminal, 130, is used in the client subsystem, 124. The bus controller and remote terminal communicate via the transceivers, 126, and the system bus, 120. The ESN in the client subsystem provides an interface to the system bus. On one side, it fills the role of remote terminal to the 1553 bus and on the other it provides a "toolbox" of interface options, 132, for communicating with the client subsystem. The communication interface options include: UART, serial, parallel, external device connections to one or more data buses in the ESN, device enable signals, and interrupt signals. One or more of the interfaces may be used by the client subsystem depending on the needs of that subsystem. The ESN handles the packaging and transmission of the data over the system bus.

Figure 4:
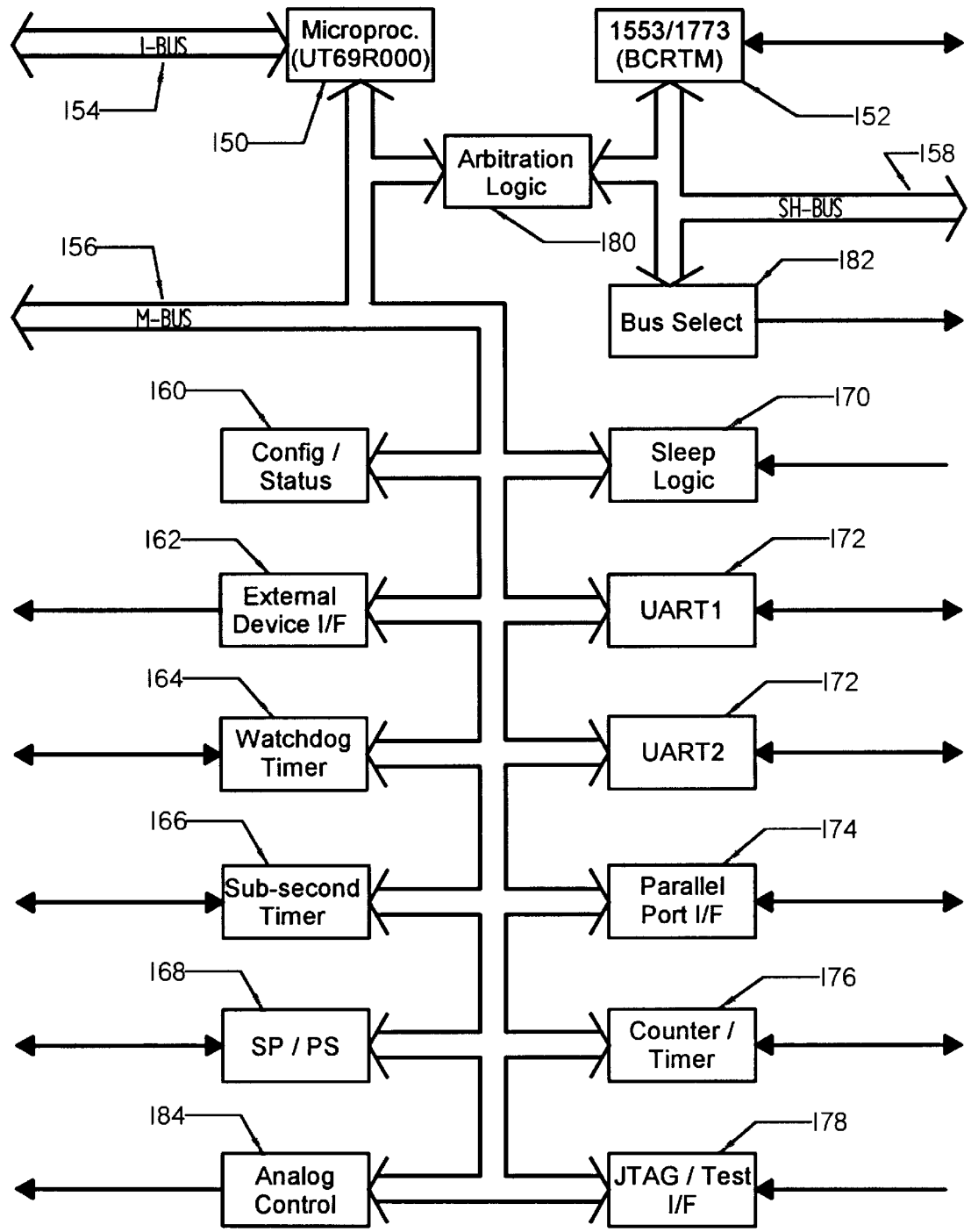
FIG. 4 is a block diagram of the architecture of the invention showing the major components.

FIG. 4 provides a block diagram of the internal architecture of the present invention. The most important components of the ASIC, from a functional perspective, are the microprocessor controller, 150; the MIL-STD-1553/1773 interface, 152; the buses, 154, 156, and 158; and the communications interfaces, 162, 168, 172, and 174. In addition, the ASIC includes various support devices. Each of these components is discussed in more detail below. RAM and ROM are provided external to the ASIC to allow for more flexible configuration. Four sets of memory are required: program ROM; program RAM; data RAM; and shared RAM.

Figure 5:
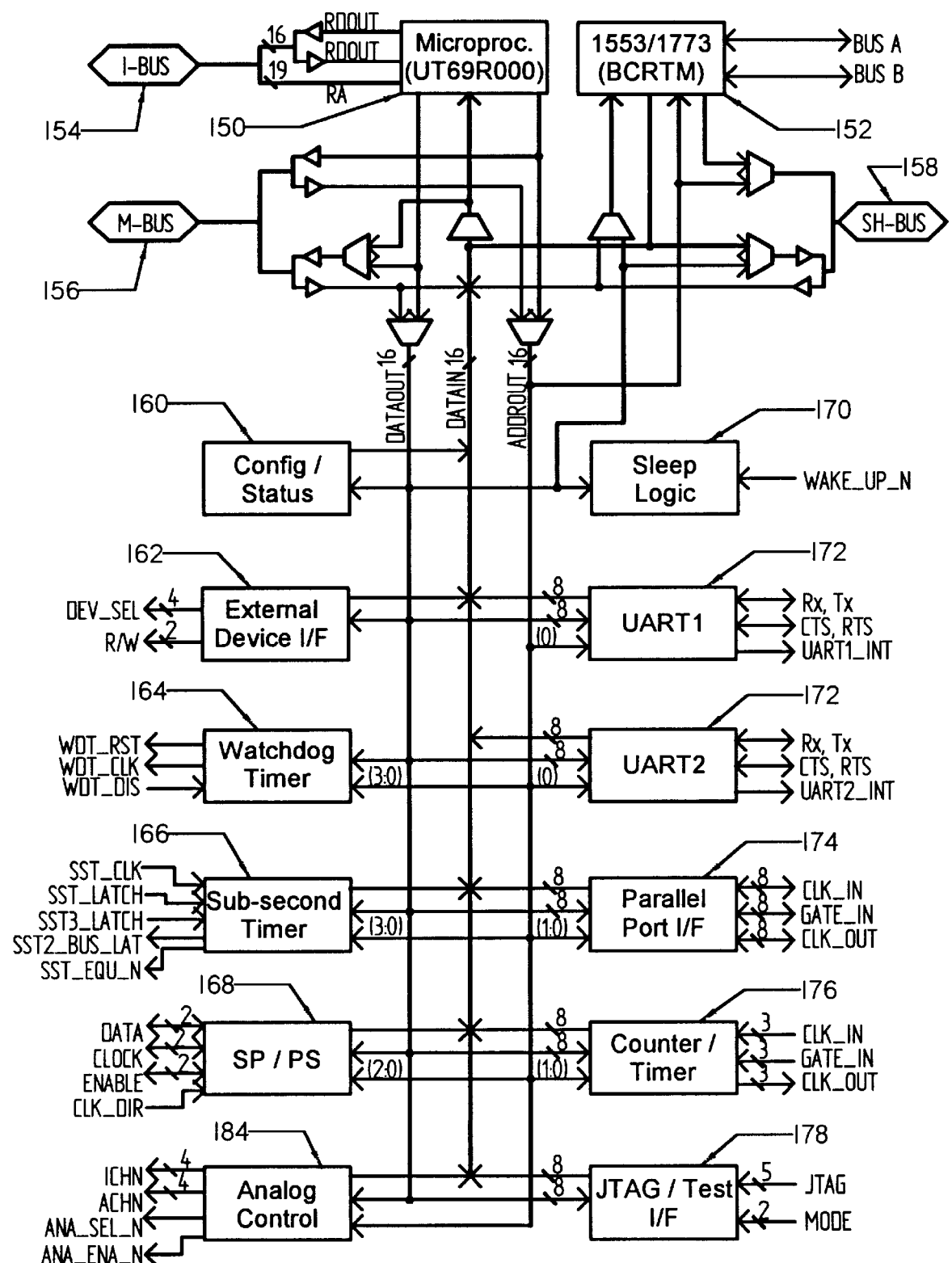
FIG. 5 is a more detailed block diagram of the invention providing additional detail for the connections.
Figure 6:
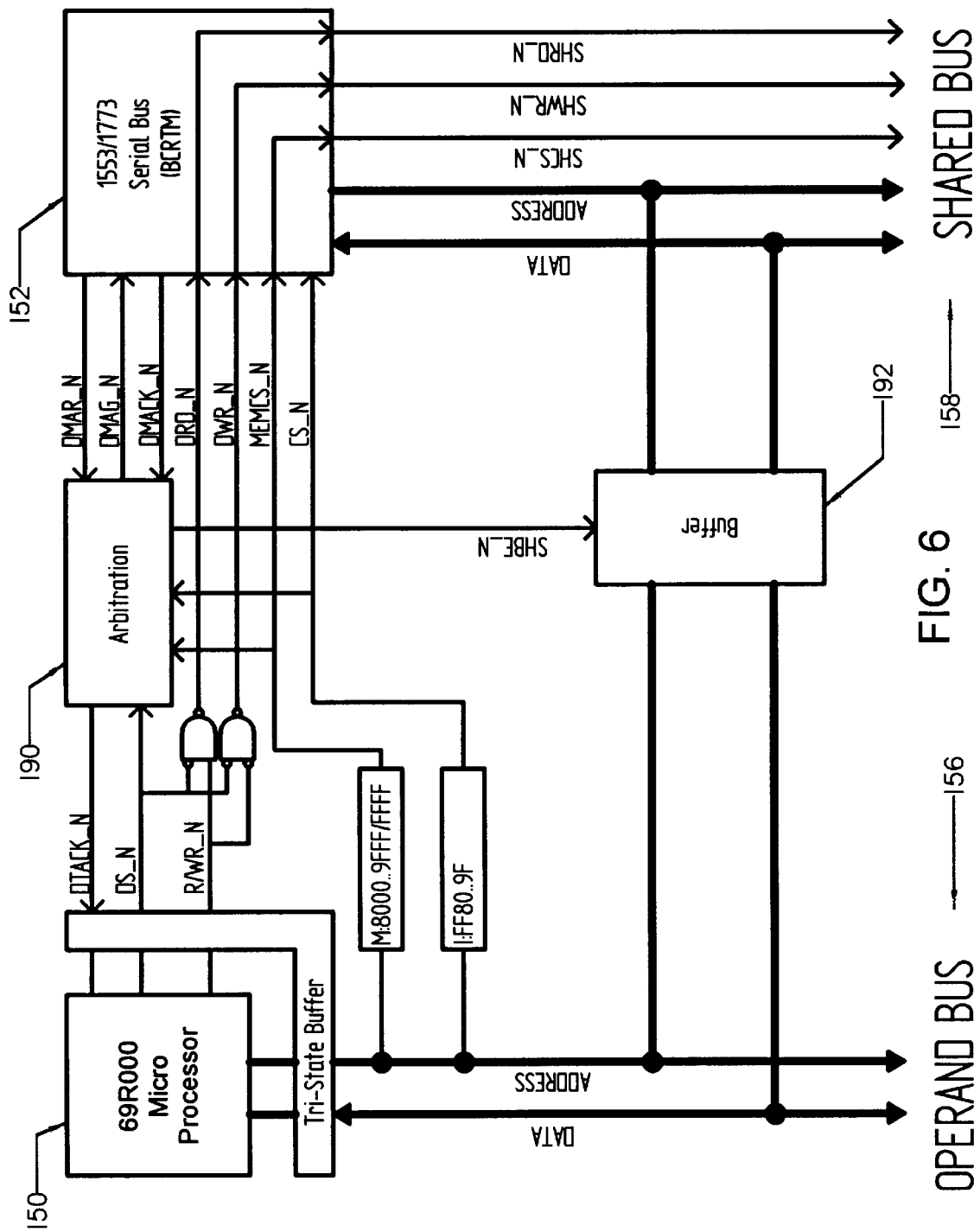
FIG. 6 is a block diagram of the arbitration circuit.

FIG. 5 provides a more detailed view of the same internal architecture as shown in FIG. 4 with increased detail shown for the buses and external interfaces. Note that the details of the arbitration logic are not shown in FIG. 5 but appear instead in FIG. 6. The following discussion is with reference to either FIG. 4 or FIG. 5 as necessary for the appropriate detail.

The inclusion of a microprocessor, 150, within the ASIC provides data processing capability as a part of the interface. Data received from the system bus is transferred from shared memory, where it was stored by the 1553/1773 interface, to the I/O devices. Data from the I/O devices, to be transmitted over the system bus, is placed in shared memory accessible to the 1553/1773 interface. In addition, the data can be operated upon before it is transferred in either direction. Such operations might include conversion from one unit of measurement to another; reformatting or packaging of data; or calculation of dependent values. This capability provides increased flexibility over a traditional design and allows customization of the interface for each application.

In the preferred embodiment, the microprocessor is a 16 bit UTMC UT69R000 RISC micro-controller. This processor is a Harvard architecture machine with 1 MW of instruction space and two 64 KW data pages. One of the data pages is used for data storage and the other is used to access I/O devices. The processor operates at two clock cycles per instruction resulting in 8 MIPs performance at 16 MHz. As a static machine, the system clock can be stopped to reduce the power requirements. The processor has 15 levels of interrupts, two 16-bit timers, two discrete inputs, eight discrete outputs, DMA support and a built-in 9600-baud UART.

The MIL-STD-1553/1773 serial interface, 152, provides a connection to the system bus. In most applications, the ESN 1553 interface will be used as a remote terminal, with the C&DH subsystem acting as bus controller. However, the 1553 interface also has the capability to support the bus controller and monitor modes of operation for increased flexibility. This increases the range of applications for which the ESN is suitable. In normal operation, the 1553 interface transfers data between the system bus and shared memory that is also accessible by the microprocessor. Transfers to and from shared memory by the 1553 interface are independent of, and can proceed in parallel with, microprocessor transfers over the instruction and operand buses.

The 1553 interface also has the capability of performing processor independent I/O with a device external to the ASIC. A range of addresses in the 1553 interface's address space is designated for processor independent I/O. A write to any of these addresses will also generate an enable signal on an output pin of the ASIC. This signal can be used to enable the external device which can then access the address and data values of the write request from the shared bus. This activity occurs without intervention by the processor and can be performed while the processor is in sleep mode or disabled because the ASIC is being used in slave mode.

In the preferred embodiment, the 1553 interface is implemented using UTMC's BCRTM design. Operating at up to 12 MHz, this interface can be configured as a bus controller, remote terminal, or bus monitor and has a 64 KW address space.

For increased flexibility, the ESN ASIC utilizes three independent 16-bit data buses. The instruction bus (I-bus), 154, is accessible only by the microprocessor and provides a dedicated connection to program RAM and boot ROM. This allows fast, no contention instruction loading by the processor.

The operand bus (M-bus), 156, provides the processor with connections to data RAM, to the I/O devices on the ASIC, and, through the arbitration logic, to the shared bus and shared memory. The connection between the processor and the operand bus utilizes tri-state buffering to allow the processor to be isolated from the operand bus. This capability provides the ability to disable the internal processor and control the operand bus with an external device. This is discussed in more detail below. An external device enable signal coupled to a range of addresses on the operand bus provides an external device interface capability that is discussed further below.

The shared bus (SH-bus), 158, provides a connection between shared memory and both the processor and the 1553 interface. Arbitration logic handles contention between the processor and the 1553 interface for use of the shared bus. As discussed above, the shared bus can also be used by the 1553 interface to provide processor independent I/O to an external device.

The choice of three independent buses provides significant flexibility for the ESN ASIC. The selection of memory mapped I/O for device access increases this flexibility. Up to three concurrent data transfers can occur simultaneously, one on each of the buses. The 1553 interface can autonomously transfer data in and out of the ASIC over the system bus without impacting the processor's performance. The use of memory mapped I/O implies that the full I/O capability of the ASIC is available to an external device, when the ASIC is used in slave mode, with no additional connections beyond those required to couple to the operand bus.

Access to the shared bus by both the internal processor and the 1553 interface requires a method to resolve contention between the devices. In the preferred embodiment, this is handled by an arbitration circuit, 180, as detailed in FIG. 6 The arbitration circuit, 190, is coupled to the processor, 150, 1553 interface, 152, operand bus, 156, and shared bus, 158. Buffer, 192, couples the operand bus to the shared bus when enabled by the arbitration logic. The arbitration logic can be viewed as a state machine with two states: processor access; and 1553 access. Transitions between the states are triggered by combinations of signals from the processor and 1553 interface. The details of the arbitration logic are not necessary to an understanding of the present invention. The conditions for transition between states can be summarized in the following rules:

1) The 1553 interface has priority over the processor. Simultaneous requests will be resolved in favor of the 1553 interface.

2) If the processor is active on the shared bus, and the 1553 interface requests access, the processor must complete its memory cycle before relinquishing control to the 1553 interface. After the current cycle, the 1553 interface is given control.

3) If the 1553 interface is active on the shared bus, the processor is held off until the 1553 interface relinquishes control.

4) While the 1553 interface is accessing the shared bus, the processor is inhibited from accessing that portion of the operand bus's address space which is mapped to the shared memory. Access to the remainder of the operand bus's address spaced in not effected.

5) The arbitration logic never affects the processor's operand bus control signals.

6) The arbitration logic does not prohibit additional arbitration logic for a dual rate 1773 or a second 1553/1773 interface connected externally to the bus.

Referring again to FIGS. 4 and 5, it can be seen that a variety of communication interfaces is provided by the present invention. The communication interfaces are accessible by the processor via the operand bus. These interfaces provide a "toolbox" of functionality from which a designer can select the needed capabilities. Instead of building a custom interface for each circuit board, the board designer can use one or more of the interfaces on the ESN ASIC. This reduces development time and cost. The variety of interfaces provided is intended to meet the needs of most common subsystems.

In the preferred embodiment, serial communications is provided via two types of interfaces: UART and serial-to-parallel (S/P), parallel-to-serial (P/S) converter set. There are two UART devices, 172, conforming to the 8251A industry standard operating in asynchronous mode. These devices provide 8-bit serial I/O.

The S/P, P/S converter pair, 168, provides serial I/O of 16 bit data words. The S/P converter interface clocks a serial data stream into a 16-bit shift register that is readable by the processor from the operand bus's I/O page. The P/S converter clocks out a serial bit stream from a 16 bit register that is loaded by the processor via the operand bus's I/O page.

Two sequential words are used to access the S/P & P/S converters. The first word is the data register for the devices. Performing an output operation to this address loads the P/S data register. An input operation from this address reads the S/P data register. Both the input and output registers are double buffered with shift registers used to clock data in and out in a serial bit stream. The second word is the status/control register for the devices. The bits of this register control and/or report the status of the devices depending on their mode. Two operational modes are supported: master and slave. In the master mode, the ESN controls the data flow on the serial connection by generating the bit clocks and data enable internally and outputting them to the external device. In slave mode, the bit clocks and data enables for the serial connection are generated externally by the external device.

Parallel communications are provided by the 8255 parallel port interface, 174. This device conforms to the 8255 industry standard and provides three 8-bit ports. Each port is independently software programmable, by way of the operand bus, for input, output, or bi-directional communication, either with or without handshaking.

The External Device Interface (EDI), 162, provides a standard interface for external peripherals. This interface generates four active low select lines and two read/write lines that may be used to select external devices and control data flow between the processor and the external device. The external device would be connected to the operand bus and could optionally use the four least significant bits of the operand address, when selected, to address locations within the device. Four sequential ranges of 16 addresses on the operand bus's I/O page are used to generate the select signals. Each of the four select signals is associated with one of the four 16 word address ranges. A load or store instruction to any address in the range will cause the corresponding select signal to be generated. In addition, a read enable or write enable signal will be generated as appropriate.

An analog control interface, 184, provides an interface to an external analog to digital (A/D) converter. The interface consists of a control register and two data registers. The control register is used to control power to the A/D converter and to select which analog channel is to be read. One of the data registers provides 12-bit data while the other provides 8-bit data. An output to either data register initiates an A/D conversion of the appropriate size storing the results in the appropriate register. An input from that register then reads the converted data.

While the clock signal for the ESN ASIC is provided externally, there are several timing related functions supplied by the ASIC. The sub-second timer (SST), 166, is a 24-bit incrementing counter that is driven by an external clock signal, SST_CLK. The frequency of this signal can be anything up to the processor's system clock. Starting at zero immediately after a system reset, the SST counts up to $2^{**}24$, then rolls over and starts again. There are three latched values and one comparison value associated with the SST. SST#1 is an internally latched value that latches the SST value when the processor inputs this register's lower 16 bits. The upper 8 bits are then available to be read later. SST#2 may be latched by either an active high signal on the ASIC's SST_LATCH input pin or by a write to shared by location S:0000 by either the processor or the 1553 interface. The second method allows the SST to be used to synchronize and maintain system time. With the 1553 interface configured as an RT, the bus controller can write the current system time to the ESN's RT address S:0000. The system time is stored at that address and the current SST value is latched into SST#2 allowing the values to be compared. The third latch, SST#3 is latched only by a high pulse on the ASIC's SST3_LATCH pin. The comparison value SST#4 can be set by the processor. When the SST count equals the value stored in SST#4, an active low pulse in generated on the SST_EQU_N ASIC pin.

There are also two counter/interval timer devices which are based on the 8254 industry standard. Each is programmable by the processor through memory mapped ports on the operand bus. Timer #1, 176, generates external clock and control signals and has all nine I/O pins available as ASIC interface pins. Timer #2 (not shown) is used to generate internal clock signals for other devices on the ESN ASIC. Its three clock-in signals are tied to an internal signal that runs at ¼th the rate of the system clock. Its three gate signals are tied high to enable them. The first clock-out signal is used as the S/P bit clock, the second clock-out signal is used as the P/S bit clock, and the third clock-out signal is used for the internal UARTs.

The ESN ASIC features a watch dog timer (WDT), 164, which is used to reset the ASIC in case of error. The WDT is a 24-bit up-counter clocked by the CPU's system clock. When the WDT rolls over, the WDT control register is checked to verify that the "I'm OK" bit has been set by the software. If set, the bit is cleared, and the WDT continues counting. If the "I'm OK" bit is clear, an error is presumed, and a WDT reset signal is generated. This signal resets all devices on the ASIC except the processor. The signal is also available on an external pin and can be coupled to external logic that can then, optionally, reset the processor. At the user's option, the WDT can be disabled by grounding the WDT_DIS_N pin. The WDT also generates a number of lower frequency clocks for use by other devices. One of these clocks, at ¹⁄₁₆th the frequency of the system clock, is made available externally. For applications that need additional clocks, this clock removes the requirement of a second oscillator.

The configuration/status port, 160, can be used to monitor and control the ESN's UART's, memory configurations, and device reset configurations. It provides status information on both UARTs (transmit ready, receive ready), the watch dog timer, sleep mode disable, and the reset state of the 1553 interface and the other devices. Certain bits can be written to select the size of the four external memory areas (8 k or 32 k) and to reset the 1553 interface and other devices.

In spacecraft applications, power is often a limited resource. The sleep logic, 170, addresses this issue by providing the ability to put the processor to sleep. It does this by stopping the clock signal to the processor, keeping it from executing. Sleep mode is activated by the processor itself writing a specific data pattern to a specific address on the instruction bus. In sleep mode, the processor draws less power while the other devices on the ASIC remain active and still draw power. The processor can be awakened either by an active low signal on the external WAKE_UP_N pin or by asserting any of the processors interrupt or exception pins. The anticipated method of awakening the processor is to couple one, or more, of the 1553 interfaces service request signals, such as STDINTP_N or HPINT_N to one, or more, of the processor's interrupt lines. With the 1553 interface in RT mode, the bus controller, typically in the C&DH subsystem, can command the 1553 RT to generate an interrupt and awaken the processor when needed. Since the other devices remain active, limited I/O processing can occur without waking the processor. A specific example is that the 1553 interface can receive and transfer data via the processor independent I/O functionality while the processor remains in sleep mode. By also coupling the service request signals of select other input devices to the interrupt pins of the processor, the processor may normally remain in sleep mode, awakening only to process requests from the I/O devices.

As discussed above, the processor, 150, has a buffered connection to the operand bus, 156, allowing it to be isolated and the bus connected to an external device. This capability is intended primarily to allow daisy chaining of two or more ESN ASICs to expand the I/O capability, but could be used to couple the ESN to a different external device. The ESN has two operational modes, in addition to test modes, controlled by two external MODE pins. In mode 00, the processor is enabled and the ESN operates as described above. In mode 01, the processor is disabled and isolated from the operand bus. All other devices operate as previously described. All operand bus control lines are changed from output signals from the ASIC to input signals. This permits an external device to have complete control of the bus. When the external device is another ESN with the processor enabled, the effect is an ESN with twice the normal number of I/O devices and either a connection to a second system bus or a redundant connection to the same bus. This expansion is achieved with an interface already known to the developer, reducing the learning curve and cost. The use of memory mapped I/O and device enable signals tied to specified address ranges, as discussed above, contributes to the simplicity of this daisy chaining.

Figure 7:
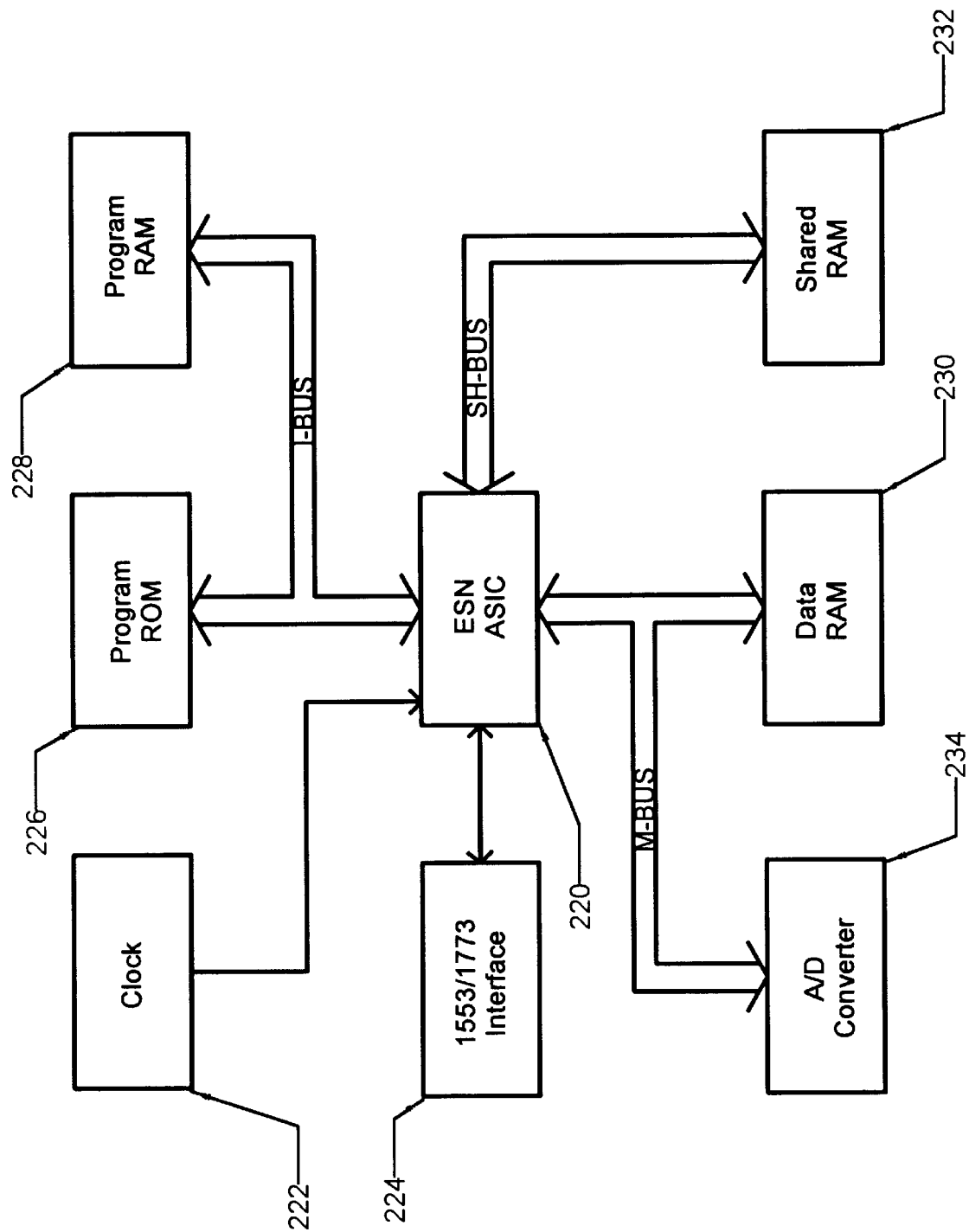
FIG. 7 shows the invention as it would typically be used, connected to the necessary external devices.

FIG. 7 illustrates the minimum hardware configuration in which the ESN ASIC is usable. This configuration is comprised of the ESN, 220, a clock chip, 222, a Mil-STD-1553/1773 interface chip/connector, 224, and four sets of memory: program (boot) ROM, 226, program RAM, 228, data RAM, 230, and shared RAM, 232. In addition, an analog to digital converter and current source, 234, will be required if analog capability is needed. In the preferred embodiment, the ESN requires three clocks: the processor system clock (OSCIN); the processor's UART clock (TIMCLK) and the BCRTM's system clock (CLK_12 MHZ). In the minimum configuration, a clock chip with a 50% duty cycle is connected to the processor's system clock and the BCRTM's clock. The processor's output clock (OSCOUT) is then connected to the processor's UART clock. The ESN requires one voltage and one ground: +5V power and ground. The recommended supply voltage is +5V±0.5V.

While the preferred form of the invention has been disclosed above, alternative methods of practicing the invention are readily apparent to the skilled practitioner. The above description of the preferred embodiment is intended to be illustrative only and not to limit the scope of the invention.

We claim:

1. A single chip integrated circuit computing system comprising:

(a) a microprocessor;

(b) an operand bus coupled to said microprocessor;

(c) a serial interface circuit, in communication with said microprocessor;

(d) an instruction bus, coupled to said microprocessor, which operates independently of said operand bus, whereby said microprocessor can simultaneously access instructions and operands;

(e) a clock circuit for providing a clock signal to said microprocessor;

(f) a shared bus;

(g) means for coupling said shared bus to said operand bus and to said serial interface; said means for coupling comprising an arbitration circuit which provides access to said shared bus by only one of said operand bus and said serial interface at a time;

(h) a low power logic circuit coupled to said microprocessor and coupled to said clock circuit which functions by blocking the transmission of said clock signal to said microprocessor;

(i) a sleep mode activation circuit coupled to said microprocessor and to said low power logic circuit whereby said microprocessor can activate the low power mode; and (j) a sleep mode termination circuit coupled to said serial interface and to said low power logic circuit whereby said serial interface can terminate the low power mode; and (k) plural communication devices, coupled to said operand bus, each of said communication devices coupled to plural external interface terminals;

wherein said communication between said microprocessor and said serial interface comprises communication over said operand bus.

2. A single chip integrated circuit computing system comprising:

(a) a microprocessor;

(b) a clock circuit for providing a clock signal to said microprocessor;

(c) a serial interface circuit, in communication with said microprocessor;

(d) a low power logic circuit coupled to said microprocessor and coupled to said clock circuit which functions by blocking the transmission of said clock signal to said microprocessor;

(e) a sleep mode activation circuit coupled to said microprocessor and to said low power logic circuit whereby said microprocessor can activate the low power mode; and (f) a sleep mode termination circuit coupled to said serial interface and to said low power logic circuit whereby said serial interface can terminate the low power mode;

(g) a shared bus; and (h) means for coupling said shared bus to said microprocessor and to said serial interface; said means for coupling comprising an arbitration circuit which provides access to said shared bus by only one of said microprocessor and said serial interface at a time.

3. A single chip integrated circuit computing system comprising:

(a) a microprocessor;

(b) a clock circuit for providing a clock signal to said microprocessor;

(c) a serial interface circuit, in communication with said microprocessor;

(d) a low power logic circuit coupled to said microprocessor and coupled to said clock circuit which functions by blocking the transmission of said clock signal to said microprocessor;

(e) a sleep mode activation circuit coupled to said microprocessor and to said low power logic circuit whereby said microprocessor can activate the low power mode; and (f) a sleep mode termination circuit coupled to said serial interface and to said low power logic circuit whereby said serial interface can terminate the low power mode;

(g) an operand bus coupled to said microprocessor;

(h) plural communication devices, coupled to said operand bus, each of said communication devices coupled to plural external interface terminals;

(i) a shared bus; and (j) means for coupling said shared bus to said microprocessor and to said serial interface, said means for coupling utilizing said operand bus as the connection to said microprocessor;

said means for coupling comprising an arbitration circuit which provides access to said shared bus by only one of said operand bus and said serial interface at a time.

4. A computing system comprising:

(a) a single chip integrated circuit comprising:

(i) a microprocessor;

(ii) a clock circuit for providing a clock signal to said microprocessor;

(iii) a communications interface circuit, in communication with said microprocessor;

(iv) a low power logic circuit coupled to said microprocessor and coupled to said clock circuit which functions by blocking the transmission of said clock signal to said microprocessor;

(v) a sleep mode activation circuit coupled to said microprocessor and to said low power logic circuit whereby said microprocessor can activate the low power mode;

(vi) a sleep mode termination circuit coupled to said communications interface and to said low power logic circuit whereby said communications interface can terminate the low power mode;

(vii) an operand bus coupled to said microprocessor and to said communications interface circuit;

(viii) plural communication devices, coupled to said operand bus, each of said communication devices coupled to plural external interface terminals; and (ix) bus connection means having plural external interface terminals for coupling said operand bus to a device external to the integrated circuit whereby the external device can access said plural communication devices independently of said microprocessor.

5. The integrated circuit of claim 4 wherein said communications interface circuit utilizes a serial protocol.

6. The integrated circuit of claim 5 further comprising means for selectively preventing said microprocessor from accessing said operand bus.

7. The integrated circuit of claim 6 further comprising a shared bus and means for coupling said shared bus to said microprocessor and to said serial interface.

8. The integrated circuit of claim 7 wherein said means for coupling comprises an arbitration circuit which provides simultaneous access to said shared bus by only one of said operand bus and said serial interface.

9. The integrated circuit of claim 5 wherein said external device is a second instance of the claimed integrated circuit.

10. The integrated circuit of claim 5 further comprising an external device command interface comprising at least one external terminal coupled to said serial interface for transmission of a select signal whereby said serial interface can activate an external device independently of said microprocessor.

11. A single chip integrated circuit computing system comprising:

(a) a microprocessor;

(b) a clock circuit for providing a clock signal to said microprocessor;

(c) a MIL-STD-1553 compliant serial interface circuit;

(d) a low power logic circuit coupled to said microprocessor and coupled to said clock circuit which functions by blocking the transmission of said clock signal to said microprocessor;

(e) a sleep mode activation circuit coupled to said microprocessor and to said low power logic circuit whereby said microprocessor can activate the low power mode;

(f) a sleep mode termination circuit coupled to said serial interface and to said low power logic circuit whereby said serial interface can terminate the low power mode;

(g) an operand bus coupled to said microprocessor and to said serial interface;

(h) plural communication devices, coupled to said operand bus, each of said communication devices coupled to plural external interface terminals, at least one of said communication devices conforming to the 8251A UART industry standard; at least one of said communication devices conforming to the 8255 parallel port industry standard; at least one of said communication devices functioning as a serial-to-parallel and parallel-to-serial converter; and at least one of said communication devices providing an external device data interface comprising plural device select signals and plural data transfer control signals;

(i) bus connection means having plural external interface terminals for coupling said operand bus to a device external to the integrated circuit whereby the external device can access said plural communication devices independently of said microprocessor;

(j) means for selectively disabling said microprocessor thereby preventing it from accessing said operand bus;

(k) an instruction bus, coupled to said microprocessor, which operates independently of said operand bus, whereby said microprocessor can simultaneously access instructions and operands;

(l) a shared bus;

(m) means for coupling said shared bus to said operand bus and to said serial interface comprising an arbitration circuit which provides access to said shared bus by only one of said operand bus and said serial interface at a time.

12. The integrated circuit of claim 11 further comprising plural external interface terminals numbered sequentially corresponding to their physical location in the integrated circuit chip and having the following correspondence between said terminal numbers and their logical functions:

(a) pins 4–6, 9–21: Operand Bus Data;

(b) pins 22–27, 30–39: Operand Bus Address;

(c) pins 87–102: Instruction Bus Data;

(d) pins 103, 106–123, 126: Instruction Bus Address;

(e) pins 163–178: Shared Bus Data;

(f) pins 190–199, 202–207: Shared Bus Address;

(g) pins 127, 129: 1553 Transmit Inhibit;

(h) pins 128,130: 1773 Transmit;

(i) pin 131: BC/RT Select;

(j) pin 132: Lock (k) pins 134–137: Receive;

(l) pins 138–142: Remote Terminal Address;

(m) pin 143: RT Address Parity;

(n) pin 144: subsystem fail;

(o) pins 147–150: Transmit;

(p) pin 154: BCRTM Fail;

(q) pin 155: RT Command Strobe;

(r) pin 156: High Priority Interrupt;

(s) pin 161: Standard Interrupt Level;

(t) pin 162: Standard Interrupt Pulse; and (u) pin 179: BCRTM Clock.

13. A distributed computing system comprising:

(a) one or more processing subsystems;

(b) a means for communicating;

(c) plural single-chip ASIC interface devices, at least one connected to each of said processing subsystems, each of said ASIC interface devices coupled to said means for communicating, each of said ASIC interface devices comprising:

(i) a microprocessor;

(ii) a clock circuit for providing a clock signal to said microprocessor;

(iii) an interface circuit compatible with said means for communicating, coupled to said microprocessor;

(iv) an operand bus coupled to said microprocessor;

(v) plural communication devices, coupled to said operand bus, each of said communication devices coupled to plural external interface terminals.

14. The distributed computing system of claim 13 further comprising one or more task specific subsystems, coupled to said means for communicating by at least one of said ASIC interface devices, which is a data collection instrument.

15. The distributed computing system of claim 13 further comprising one or more task specific subsystems, coupled to said means for communicating by at least one of said ASIC interface devices, which is a device control subsystem.

16. The distributed computing system of claim 13 wherein each of said ASIC interface devices further comprises:

(a) a low power logic circuit coupled to said microprocessor and coupled to said clock circuit which functions by blocking the transmission of said clock signal to said microprocessor;

(b) a sleep mode activation circuit coupled to said microprocessor and to said low power logic circuit whereby said microprocessor can activate the low power mode;

(c) a sleep mode termination circuit coupled to said serial interface and to said low power logic circuit whereby said serial interface can terminate the low power mode.

17. The distributed computing system of claim 13 wherein each of said ASIC interface devices further comprises:

(a) an instruction bus, coupled to said microprocessor, which operates independently of said operand bus, whereby said microprocessor can simultaneously access instructions and operands;

(b) a shared bus;

(c) means for coupling said shared bus to said operand bus and to said serial interface comprising an arbitration circuit which provides access to said shared bus by only one of said operand bus and said serial interface at a time.

\* \* \* \* \*